(12) United States Patent
Ruppe

(10) Patent No.: US 7,490,903 B2
(45) Date of Patent: Feb. 17, 2009

(54) TILTABLE SEAT MOUNTING APPARATUS

(76) Inventor: Fredy L. Ruppe, RR 2 Box 324, Livingston, KY (US) 40445

( * ) Notice: Subject to any disclaimer, the term of this patent is extended or adjusted under 35 U.S.C. 154(b) by 395 days.

(21) Appl. No.: 11/438,854

(22) Filed: May 23, 2006

(65) Prior Publication Data

US 2007/0272818 A1 Nov. 29, 2007

(51) Int. Cl.
*B60N 2/02* (2006.01)

(52) U.S. Cl. .................................. 297/314; 248/371

(58) Field of Classification Search .................. 297/313, 297/314; 248/371, 372.1, 185.1
See application file for complete search history.

(56) References Cited

U.S. PATENT DOCUMENTS

| | | | |
|---|---|---|---|
| 1,640,812 A | 8/1927 | Ammon | |
| 3,466,089 A | 9/1969 | Stueckle | |
| 3,970,274 A | 7/1976 | Resk | |
| 4,095,770 A | 6/1978 | Long | |
| 4,183,492 A | 1/1980 | Meiller | |
| 4,466,590 A * | 8/1984 | Parks et al. | 248/185.1 |
| 4,500,062 A | 2/1985 | Sandvik | |
| 4,515,337 A * | 5/1985 | Torras | 297/314 X |
| 5,054,739 A * | 10/1991 | Wallin | 297/314 |
| 5,372,347 A * | 12/1994 | Minnich | 248/371 |

\* cited by examiner

*Primary Examiner*—Anthony D Barfield
(74) *Attorney, Agent, or Firm*—Raymond M. Galasso; Galasso & Associates, LP.

(57) ABSTRACT

A tiltable seat apparatus comprises a mounting structure attachable a vehicle chassis and including spaced-apart upstanding portions and a mounting member connected between the upstanding portions. A seat assembly includes a seat frame having spaced-apart downstanding portions. Each one of the downstanding portions is pivotably attached to a respective one of the upstanding portions such that an axis of rotation extends through the downstanding and upstanding portions whereby the seat frame pivots about the axis of rotation. A resilient member is engaged between the mounting structure and the seat attachment structure, and allows the seat assembly to pivot about the axis of rotation with respect to the mounting structure between a static orientation and an angularly displaced orientation. The resilient member exerts force on the mounting structure and the seat assembly when in the angularly displaced orientation for biasing the seat attachment structure toward the static orientation.

6 Claims, 2 Drawing Sheets

TILTABLE SEAT MOUNTING APPARATUS

FIELD OF THE DISCLOSURE

The disclosures made herein relate generally to vehicles with an operator seat and, more particularly, to horizontally tiltable operator seats.

BACKGROUND

It is generally desirable for the operator of a vehicle such as an agricultural tractor or a highway mower to sit level relative to the horizontal while operating the vehicle. Afflictions such as fatigue, back pain and the like can result if the operator is made uncomfortable due to an unlevel seat. Sustained operation of the vehicle over inclined areas, such as mowing the grassy banks adjacent limited access highways, can quickly lead to these afflictions when the operator sits on a seating surface that is generally parallel with incline d terrain over which the vehicle is travelling. Moreover, the operator of a vehicle travelling across an inclined terrain is less able to maintain safe control of the vehicle and/or preclude contributing to a vehicle roll-over if he or she is not seated in a generally upright orientation.

Various tiltable seat mounting structures that maintain a vehicle seat level with respect to the horizontal are known. Examples of such known tiltable seat mounting structures are disclosed in U.S. Pat. Nos. 5,372,347; 4,515,337; 4,500,062; 4,183,492; 4,095,770; 3,970,274; 4,466,089 and 1,640,812. While these prior devices meet some of the objectives for a horizontally tiltable vehicle seat, they have not completely met the objectives or the requirements for such a seat, and are thus known to have shortcomings. Examples of such shortcomings include, but are not limited to, complexity in design, being cumbersome to operate, offering limited tiltability, being relatively expensive and being expensive to manufacture. Therefore, a self-levelling seat structure that overcomes shortcomings associated with conventional self-levelling seat structures would be advantageous, desirable and useful.

SUMMARY OF THE DISCLOSURE

Embodiments of the present invention relate to a tiltable seat mounting apparatus for vehicles such as, for example, agricultural tractors or highway mowers. Such a tiltable seat mounting apparatus in accordance with the present invention enables an operator of the vehicle to generally sit level relative to the horizontal while operating the vehicle on an inclined surface (e.g., driving the vehicle horizontally across the inclined surface). By enabling the operator to sit generally level, the tiltable seat mounting apparatus alleviates adverse considerations such as, for example, general fatigue, back pain and the like during sustained operation of the vehicle over inclined surfaces thereby reducing the potential for enhancing the operator's ability to maintain safe control of the vehicle and/or reducing the potential for the vehicle rolling-over due in part to the weight distribution of the operator. Furthermore, a tiltable seat mounting apparatus in accordance with the present invention overcomes shortcomings associated with conventional tiltable seat mounting structures.

In one embodiment of the present invention, a tiltable seat mounting apparatus comprises a mounting structure, a seat attachment structure and a resilient member. The mounting structure is configured for being attached to a chassis of a vehicle. The mounting structure includes spaced-apart upstanding portions and a mounting member connected between the upstanding portions. The seat attachment structure is configured for being attached to a seat usable with the vehicle. The seat attachment structure includes spaced-apart downstanding portions and a seat attachment member connected between the downstanding portions. Each one of the downstanding portions is pivotably attached to a respective one of the upstanding portions such that an axis of rotation extends through the downstanding and upstanding portions whereby the seat attachment structure pivots about the axis of rotation. The resilient member is engaged between the mounting structure and the seat attachment structure. The resilient member allows the seat attachment structure to pivot about the axis of rotation with respect to the mounting structure between a static orientation and an angularly displaced orientation. The resilient member exerts force on the mounting structure and the seat attachment structure when in the angularly displaced orientation for biasing the seat attachment structure toward the static orientation.

In another embodiment of the present invention, a tiltable seat mounting apparatus comprises a mounting structure, a seat attachment structure, pivot means and self-centering means. The mounting structure is configured for being attached to a chassis of a vehicle. The mounting structure includes spaced-apart upstanding portions and a mounting member connected between the upstanding portions. The seat attachment structure is configured for being attached to a seat usable with the vehicle. The seat attachment structure includes spaced-apart downstanding portions and a seat attachment member connected between the downstanding portions. A first one of the downstanding portions is juxtaposed to a first one of the upstanding portions. A second one of the downstanding portions is juxtaposed to a second one of the upstanding portions. The pivot means has an axis of rotation that extends through the juxtaposed downstanding and upstanding portions. The pivot means connects the juxtaposed downstanding and upstanding portions so the seat attachment structure pivots on the pivot means about the axis of rotation. The self-centering means is engaged between the mounting structure and the seat attachment structure. The self-centering means allows the seat attachment structure to pivot about the axis of rotation with respect to the mounting structure between a static orientation and an angularly displaced orientation. The self-centering means exerts force on the mounting structure and the seat attachment structure when in the angularly displaced orientation for biasing the seat attachment structure toward the static orientation.

In another embodiment of the present invention, a tiltable seat apparatus comprises a mounting structure, a seat assembly and a resilient member. The mounting structure is configured for being attached to a chassis of a vehicle. The mounting structure includes spaced-apart upstanding portions and a mounting member connected between the upstanding portions. The seat assembly includes a seat frame having spaced-apart downstanding portions. Each one of the downstanding portions is pivotably attached to a respective one of the upstanding portions such that an axis of rotation extends through the downstanding and upstanding portions whereby the seat frame pivots about the axis of rotation. The resilient member is engaged between the mounting structure and the seat attachment structure. The resilient member allows the seat assembly to pivot about the axis of rotation with respect to the mounting structure between a static orientation and an angularly displaced orientation. The resilient member exerts force on the mounting structure and the seat assembly when in the angularly displaced orientation for biasing the seat attachment structure toward the static orientation.

Turning now to specific aspects of the present invention, in at least one embodiment, the self-centering means includes a spring and a preload adjuster.

In at least one embodiment of the present invention, the spring is engaged between the mounting structure and the seat attachment structure, the spring allows the seat attachment structure to pivot about the axis of rotation with respect to the mounting structure between a static orientation and an angularly displaced orientation, the spring exerts force on the mounting structure and/or the seat attachment structure when in the angularly displaced orientation for biasing the seat attachment structure toward the static orientation and the preload adjuster is engaged with the spring for enabling selective adjustment of a preload force exerted by the spring when the seat attachment structure is in the static orientation.

In at least one embodiment of the present invention, the preload adjuster is engaged with the mounting member and the spring is a leaf spring having end portions engaged with the preload adjuster and a central portion engaged with the seat attachment member.

In at least one embodiment of the present invention, the mounting member is generally flat and has opposing edge portions with a respective one of the upstanding portions attached to one of the edge portions of the mounting member, and the seat attachment member is generally flat and has opposing edge portions with a respective one of the downstanding portions attached to one of the edge portions of the seat attachment member.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
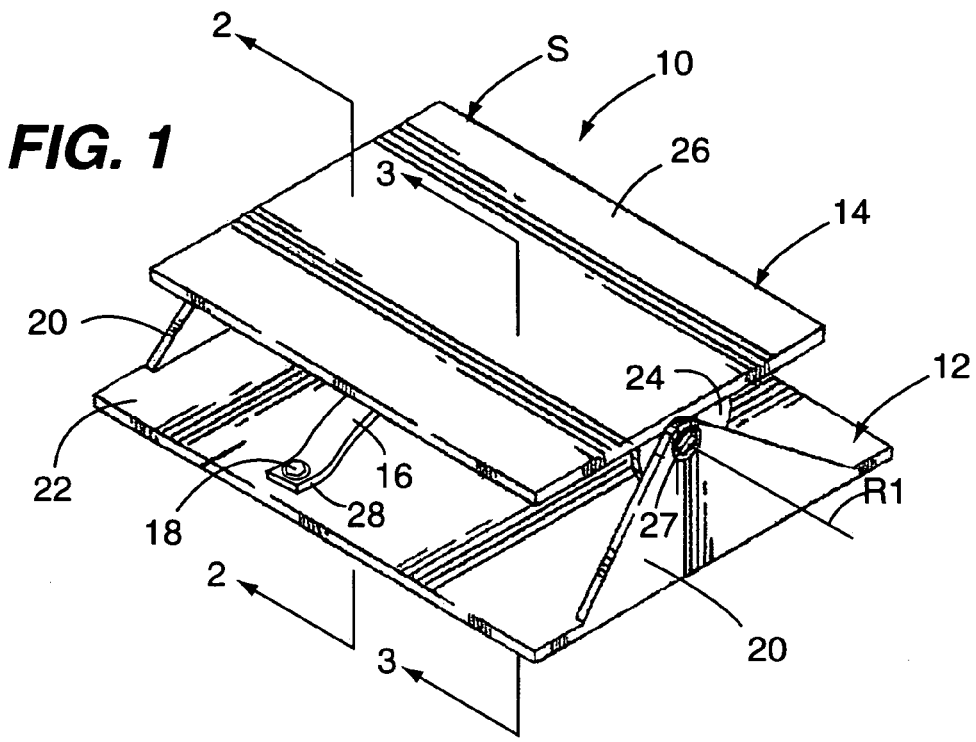
FIG. 1 is a perspective view depicting an embodiment of a tiltable seat mounting apparatus in accordance with the present invention.
Figure 2:
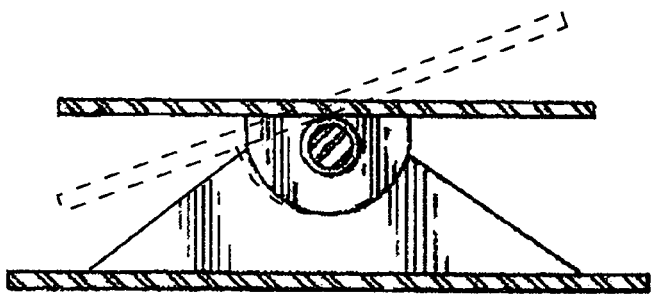
FIG. 2 is a cross-sectional view taken along the line 2-2 in FIG. 1.
Figure 3:
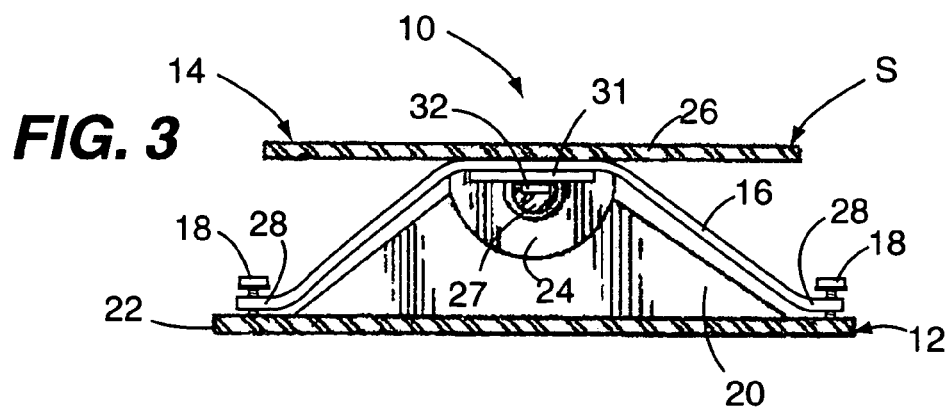
FIG. 3 is a cross-sectional view taken along the line 3-3 in FIG. 1.
Figure 4:
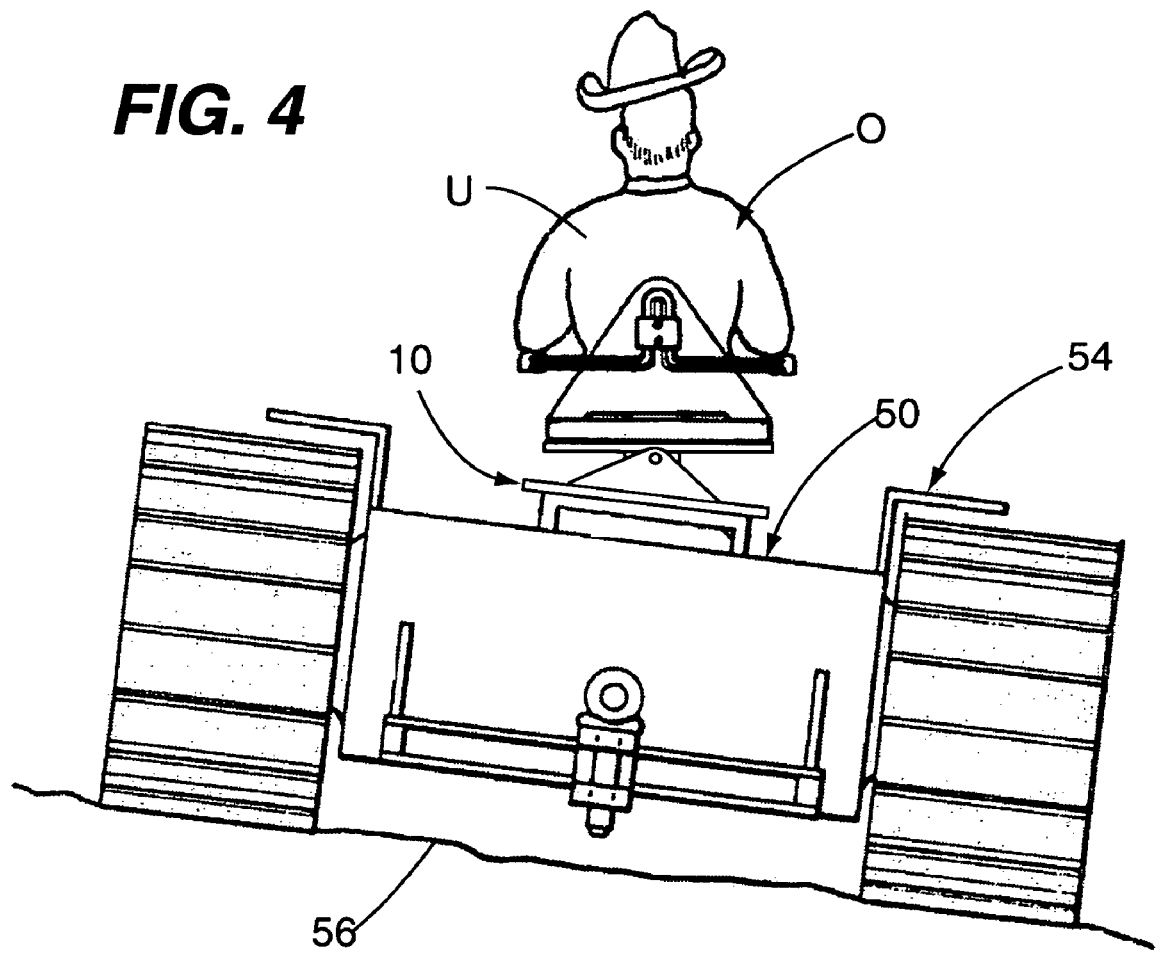
FIG. 4 is a rear view of a vehicle equipped with a tiltable seat mounting apparatus in accordance with the present invention.

FIGS. 1-3 depict various aspects of a tiltable seat mounting apparatus in accordance with the present invention, which is referred to herein as the tiltable seat mounting apparatus 10. The tiltable seat mounting apparatus 10 includes a mounting structure 12, a seat attachment structure 14, a leaf spring 16 and a plurality of preload adjusters 18. The mounting structure 12 is configured for being attached to a chassis of a vehicle (e.g., directly or indirectly). The seat attachment structure 14 is configured for being attached to a seat usable with the vehicle (e.g., a original equipment seat of the vehicle). Examples of attachment configurations include, but are not limited to, being configured for being welded, being configured for being secured with threaded fasteners and the like. It is disclosed herein that, alternatively, a seat attachment structure in accordance with the present invention may be integral with a seat frame of a seat and/or a mounting structure in accordance with the present invention may be integral with a chassis of a vehicle.

The mounting structure 12 includes spaced-apart upstanding portions 20 and a mounting member 22 connected between the upstanding portions 20. The seat attachment structure 14 includes spaced-apart downstanding portions 24 and a seat attachment member 26 connected between the downstanding portions 24. Each one of the downstanding portions 24 is pivotably attached to a respective one of the upstanding portions 20 such that an axis of rotation R1 (FIG. 1) extends through the downstanding portions 24 and the upstanding portions 20. In this manner, the seat attachment structure 14 pivots about the axis of rotation R1 relative to the mounting structure 12.

More specifically, a first one of the downstanding portions 24 is juxtaposed to a first one of the upstanding portions 20 and a second one of the downstanding portions 24 is juxtaposed to a second one of the upstanding portions 20. A pivot means extends through the juxtaposed downstanding portions 24 and upstanding portions 20 along the axis of rotation R1. As depicted, a shaft 27 extends through a hole in each one of the downstanding portions 24 and the upstanding portions 20. The shaft 27 is in interference fit with the holes of at least a portion of the downstanding portions 24 and the upstanding portions 20. Optionally, the shaft 27 may be held in place with a plurality of locking collars and, optionally, separate shafts extending through the holes in respective pairings of juxtaposed ones of the downstanding portions 24 and upstanding portions may be provided for enabling the seat attachment structure 14 to pivot on the pivot means about the axis of rotation R1.

The leaf spring 16 is engaged between the mounting structure 12 and the seat attachment structure 14 and extends generally laterally with respect to the axis of rotation R1. The leaf spring 16 is engaged between the mounting structure 12 and the seat attachment structure 14 in a manner that allows the seat attachment structure 14 to pivot about the axis of rotation R1 with respect to the mounting structure 12 between a static orientation S and an angularly displaced orientation D. The leaf spring 16 exerts force on the mounting structure 14 and the seat attachment structure 12 when in the angularly displaced orientation D for biasing the seat attachment structure 14 toward the static orientation S.

More specifically, each end portions 28 of the leaf spring 16 has one of the preload adjusters 18 adjustably engaged therewith. Each one of the preload adjusters 18 is engaged with the mounting member 22 for transmitting force from the leaf spring 16 to the mounting member 22. In the depicted embodiment, the each spring adjuster 18 is a threaded fastener threadedly engaged within a respective threaded hole of the respective one of the end portions 28. A central portion 30 (FIG. 3) of the leaf spring 16 is engaged with the seat attachment structure 14 via a backing plate 31 and fastener 32. In this manner, each one of the preload adjusters 18 is adjustably engaged with the respective end portion 28 of the resilient member 16 for enabling selective adjustment of a preload force exerted by the leaf spring 16 when the seat attachment structure 14 is in the static orientation S. Through such preload adjustment, the static orientation of the seat attachment structure 14 may be adjusted and/or a degree of applied load required for moving the seat attachment structure 14 from the static orientation S toward the displaced orientation D may be adjusted (i.e., generally referred to herein as self-centering functionality).

The leaf spring 16 is an embodiment of a self-centering means implemented in accordance with the present invention. Furthermore, the leaf spring 16 is an example a resilient member in accordance with the present invention. Spaced apart compression springs engaged between the mounting structure 14 and the seat attachment structure 12 and spaced equidistant from the axis of rotation R1 are jointly another embodiment of a self-centering means in accordance with the present invention. Adjustable preload functionality may be provided by a threaded fastener threadedly engaged with the mounting structure 14 of the seat attachment structure 12 in a manner that enables each of the compression springs to be statically compressed through rotation of the threaded fastener.

It is disclosed herein that a preload adjuster in accordance with the present invention may be integral with the seat attachment structure 14, with the mounting structure 12 and/or with the central portion 30 of the leaf spring 16. It is further disclosed that the preload adjusters 18 may be emitted entirely.

In use, the tiltable seat mounting apparatus 10 is provided between a chassis 50 and a seat 52 of a vehicle 54. When the vehicle 54 is being driven horizontally across an inclined surface 56 (e.g., a hill), an operator O may position his or her weight and/or a force applied by the operator O such that the seat attachment structure is moved to a suitably displaced orientation so as to cause the upper portion U of the operator O to be substantially upright with respect to horizontal. This substantially upright orientation serves to increase comfort of the operator O, reduce fatigue of the operator O, enhance control of the vehicle 54 and reduce the potential for the vehicle 54 rolling over.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A tiltable seat mounting apparatus, comprising:
a mounting structure configured for being attached to a chassis of a vehicle, wherein the mounting structure includes spaced-apart upstanding portions and a mounting member connected between said upstanding portions;
a seat attachment structure configured for being attached to a seat usable with the downstanding portions and a seat attachment member connected between said downstanding portions, wherein each one of said downstanding portions is pivotably attached to a respective one of said upstanding portions such that an axis of rotation extends through said downstanding and upstanding portions whereby the seat attachment structure pivots about the axis of rotation;
a resilient member engaged between the mounting structure and the seat attachment structure, wherein the resilient member allows the seat attachment structure to pivot about the axis of rotation with respect to the mounting structure between a static orientation and an angularly displaced orientation and wherein the resilient member exerts force on the mounting structure and the seat attachment structure when in the angularly displaced orientation for biasing the seat attachment structure toward the static orientation;
wherein said resilient member includes a spring;
a preloaded adjuster engages with said spring for enabling selective adjustment of a preload force exerted by the spring when the seat attachment structure is in the static orientation;
wherein the preload adjuster is engaged with the mounting member; and
the spring is a leaf spring having end portions engaged with the preload adjuster and a central portion engaged with the seat attachment structure.

2. The tiltable seat mounting apparatus of claim 1 wherein:
the mounting member is generally flat and has opposing edge portions with a respective one of said upstanding portions attached to one of said edge portions of the mounting member; and
the seat attachment member is generally flat and has opposing edge portions with a respective one of said downstanding portions attached to one of said edge portions of the seat attachment member.

3. A tiltable seat mounting apparatus, comprising:
a mounting structure configured for being attached to a chassis of a vehicle, wherein the mounting structure includes spaced-apart upstanding portions and a mounting member connected between said upstanding portions;
a seat attachment structure configured for being attached to a seat usable with the vehicle, wherein the seat attachment structure includes spaced-apart downstanding portions and a seat attachment member connected between said downstanding portions, wherein a first one of said downstanding portions is juxtaposed to a first one of said upstanding portions and wherein a second one of said downstanding portions is juxtaposed to a second one of said upstanding portions;
pivot means having an axis of rotation that extends through said juxtaposed downstanding and upstanding portions, said pivot means connecting the juxtaposed downstanding and upstanding portions so the seat attachment structure pivots on said pivot means about the axis of rotation;
self-centering means engaged between the mounting structure and the seat attachment structure, wherein said self-centering means allows the seat attachment structure to pivot about the axis of rotation with respect to the mounting structure between a static orientation and an angularly displaced orientation and wherein the self-centering means exerts force on the mounting structure and the seat structure when in the angularly displaced orientation for biasing the seat attachment structure toward the static orientation;
said self-centering means includes a spring and a preload adjuster, the spring is engaged between the mounting structure and the seat attachment structure, wherein the spring allows the seat attachment structure to pivot about the axis of rotation with respect to the mounting structure between a static orientation and an angularly displaced orientation;
the spring exerts force on the mounting structure and the seat attachment structure when in the angularly displaced orientation for biasing the seat attachment structure toward the static orientation;

the preload adjuster is engaged with the spring for enabling selective adjustment of a preload force exerted by the spring when the seat attachment structure is in the static orientation;

the preload adjuster is engaged with the mounting member; and the spring is a leaf spring having end portions engaged with the preload adjuster and a central portion engaged with the seat attachment structure.

4. The tiltable seat mounting apparatus of claim 3 wherein:

the mounting member is generally flat and has opposing edge portions with a respective one of said upstanding portions attached to one of said edge portions of the mounting member; and the seat attachment member is generally flat and has opposing edge portions with a respective one of said downstanding portions attached to one of said edge portions of the seat attachment member.

5. A tiltable seat apparatus, comprising:

a mounting structure configured to being attached to a chassis of a vehicle, wherein the mounting structure includes space-apart upstanding portions and a mounting member connected between said upstanding portions;

a seat assembly including a seat frame having spaced-apart downstanding portions, wherein each one of said downstanding portions is pivotably attached to a respective one of said upstanding portions such that an axis of rotation extends through said downstanding and upstanding portions whereby the seat frame pivots about the axis of rotation;

a resilient member engaged between the mounting structure and the seat attachment structure, wherein the resilient member allows the seat assembly to pivot about the axis of rotation with respect to the mounting structure between a static orientation and an angularly displaced orientation and wherein the resilient member exerts force on the mounting structure and the seat assembly when in the angularly displaced orientation for biasing the seat attachment structure toward the static orientation;

the resilient member includes a spring;

a preload adjuster engaged with the spring for enabling selective adjustment of a preload force exerted by the spring when the seat frame is in the static orientation;

the preload adjuster is engaged with the mounting member; and the spring is a leaf spring having end portions engaged with the preload adjuster and a central portion engaged with the seat frame.

6. The tiltable seat mounting apparatus of claim 5 wherein:

the mounting member is generally flat and has opposing edge portion with a respective one of said upstanding portions attached to one of said edge portions of the mounting member; and the seat frame includes a generally flat portions having opposing edge portions with a respective one of said downstanding portions attached to one of said edge portions of the seat frame.

* * * * *